Oct. 9, 1928.
L. P. CHRISTMAN
1,687,057
SPRING SHACKLE
Filed Nov. 3, 1926
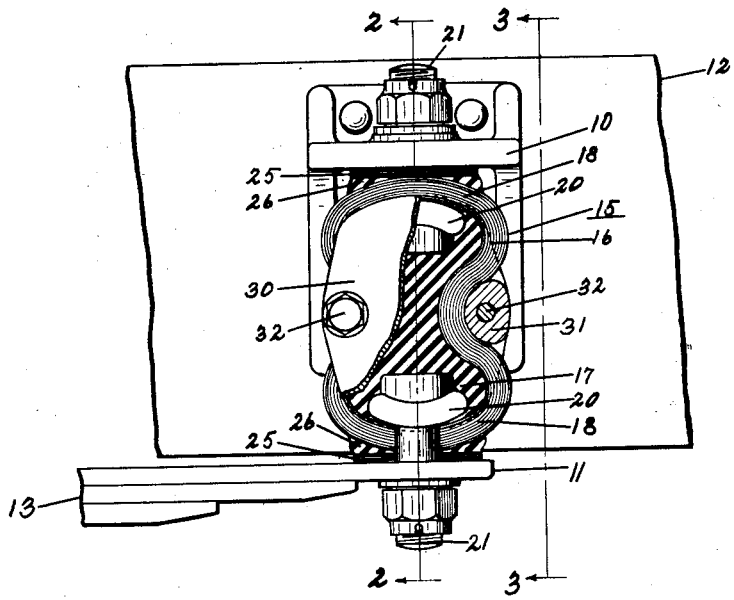
Fig.1
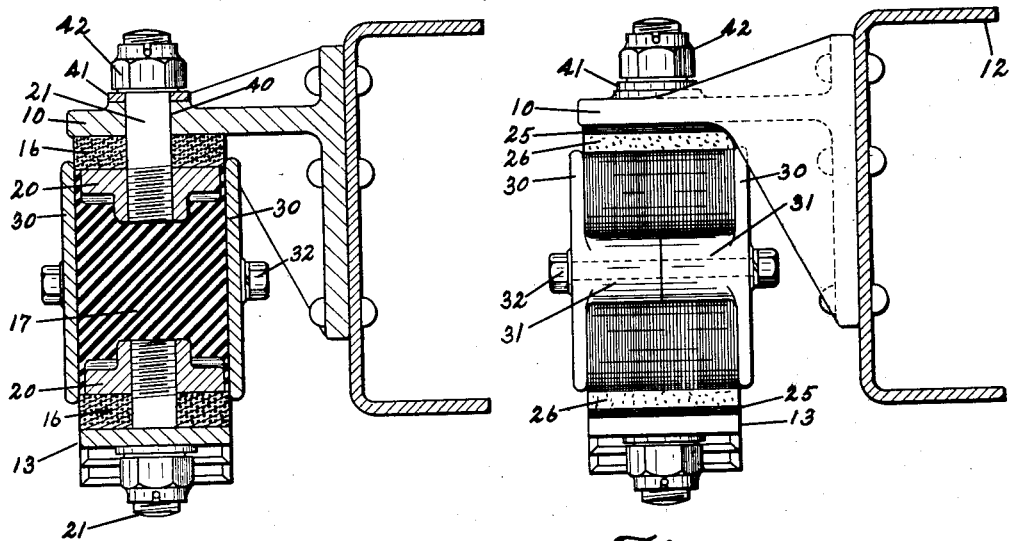
Fig.2
Fig.3
Inventor
Louis P. Christman
By Spencer Hardman & Fehr
Attorney Patented Oct. 9, 1928.

1,687,057

UNITED STATES PATENT OFFICE.

LOUIS P. CHRISTMAN, OF DAYTON, OHIO, ASSIGNOR TO THE INLAND MANUFACTURING COMPANY, OF DAYTON, OHIO, A CORPORATION OF DELAWARE.

SPRING SHACKLE.

Application filed November 3, 1926. Serial No. 146,049.

This invention relates to rubber and fabric connectors, especially such as may be used as spring shackles on vehicles.

An object of this invention is to provide an improved form of rubber and fabric connector which is efficient and long lasting in use and economical to manufacture.

Further objects and advantages of the present invention will be apparent from the following description, reference being had to the accompanying drawings wherein a preferred embodiment of one form of the present invention is clearly shown.

In the drawings:

Fig. 1 illustrates a spring shackle built according to this invention connecting the rear end of the front spring of an automobile to the chassis frame side rail. Portions are broken away to show in part, a longitudinal vertical section on the center line of the connector;

Fig. 2 is a transverse vertical section taken on line 2—2 of Fig. 1; and

Fig. 3 is an end view taken on line 3—3 of Fig. 1.

Similar reference characters refer to similar parts throughout the views.

Numerals 10 and 11 designate the two relatively movable parts connected by the shackle, 10 being a fitting rigidly secured to the chassis frame side rail 12, and 11 being the projecting end of the long leaf of the leaf spring 13.

The molded unit, indicated as a whole by 15, comprises a flexible endless rubberized fabric band 16 which preferably is composed of a plurality of turns of cord fabric wrapped with the non-extensible cords thereof extending in a peripheral direction. This fabric band 16 is molded substantially in the form of a dumb-bell, as clearly shown in Fig. 1, with the interior thereof filled with elastic soft rubber 17. The molded in metal inserts 20 have shanks 21 threaded thereto or otherwise rigidly fixed thereto, projecting outwardly at each end of unit 15 through the fabric band 16 as clearly illustrated. Relatively stiff rubberized fabric seats 25 are molded in place at each of the unit 15 and the wedge-shaped spaces between the seats 25 and the end loops 18 of the fabric band 16 are filled with soft elastic rubber 26.

After this molded unit 15, made as above described, is removed from the mold, the metal side plates 30, each having two integral projections 31, are applied to the molded unit and clamped in place by the two through bolts 32 which extend through apertures through the projections 31. The ends of projections 31 abut and thus hold the side plates 30 in fixed spaced relation.

To assemble this shackle in place between the parts 10 and 11, the upper shank 21 is inserted through a hole 40 in part 10 and the lock washer 41 and nut 42 applied to the projecting threaded end of shank 21. It will now be clear that by setting up nut 42 very tight the upper end of the flexible fabric band 16 will be tightly clamped by the metal insert 20 to the part 10. The lower end of the shackle is similarly clamped to the projecting end 11 of the spring 13.

In operation, as soon as the weight of the automobile body comes upon the shackle the elastic rubber 17 is put under compression and thus forces the fabric band 16 in tight non-slipping engagement with the projections 31. These projections 31 are rounded off and conform in shape to the neck portion of the dumb-bell unit 15 so that they will not tend to cut the fabric band 16. The metal side plates 30 limit the lateral flow or bulging of the elastic rubber 17.

When relative longitudinal movement of the spring end 11 occurs the shackle swings angularly as a whole, the flexible end loops 18 and the elastic rubber 17 permitting the required pivoting of unit 15 at each end thereof by internal distortion. The elastic rubber 26 serves to yieldably cushion the flexible loops 18 upon the seats 25 and to prevent mud, gravel, etc. from entering the wedge-shaped spaces occupied by the rubber 26.

While the form of embodiment of the present invention as herein disclosed, constitutes a preferred form, it is to be understood that other forms might be adopted, all coming within the scope of the claims which follow.

What is claimed is as follows:

1. An extension shackle for connecting two relatively movable members and having a molded unit comprising: an elastic rubber block of substantial dumb-bell form, a flexible rubberized fabric band surrounding said elastic rubber block and vulcanized thereto, a metal attaching means molded in place at each end of said molded unit for securing said unit to said relatively movable members, and an exterior metal yoke confining the neck portion of said molded unit to prevent spreading thereof when said unit is put under compression.

2. An extension shackle for connecting two relatively movable members and having a molded unit comprising: an elastic rubber block of substantial dumb-bell form, a flexible rubberized fabric band surrounding said elastic rubber block and vulcanized thereto, a metal attaching means molded in place at each end of said molded unit for securing said unit to said relatively movable members, and exterior metal walls on the lateral sides of said elastic rubber block for preventing lateral bulging of said elastic rubber.

3. An extension shackle for connecting two relatively movable members, and having a molded unit comprising: an elastic rubber block of substantial dumb-bell form, a flexible rubberized fabric band surrounding said elastic rubber block and vulcanized thereto, a metal attaching means molded in place at each end of said molded unit for securing said unit to said relatively movable members, and metal plates clamped against the lateral sides of said elastic rubber block for preventing lateral bulging thereof.

4. An extension shackle for connecting two relatively movable members and having a molded unit comprising: an elastic rubber block of substantial dumb-bell form, a flexible rubberized fabric band surrounding said elastic rubber block and vulcanized thereto, a metal attaching means molded in place at each end of said molded unit for securing said unit to said relatively movable members, and metal plates clamped against the lateral sides of said rubber block, said plates having projections extending on opposite sides of the neck portion of said molded unit to maintain the dimensions of said neck portion when said unit is put under compression.

5. An extension shackle for connecting two relatively movable members and having a molded unit comprising: an elastic rubber block of substantial dumb-bell form, a flexible rubberized fabric band surrounding said elastic rubber block and vulcanized thereto, a metal attaching means molded in place at each end of said molded unit for securing said unit to said relatively movable members, and metal plates clamped against the lateral sides of said rubber block, said plates having projections extending on opposite sides of the neck portion of said molded unit to maintain the dimensions of said neck portion when said unit is put under compression, and transverse clamping bolts extending through apertures in said projections.

6. In combination, an extension shackle connecting two relatively movable members, said shackle having a molded rubber and fabric swinging element comprising: an elastic rubber block having a narrow central neck portion and enlarged ends, a flexible rubberized fabric band surrounding and vulcanized to said rubber block, and means for confining said neck portion against spreading when said element is put under compression.

In testimony whereof I hereto affix my signature.

LOUIS P. CHRISTMAN.